United States Patent
Muto et al.

(10) Patent No.: US 12,473,392 B2
(45) Date of Patent: *Nov. 18, 2025

(54) POLYURETHANE AQUEOUS DISPERSION, ADHESIVE, SYNTHETIC LEATHER AND PAINT

(71) Applicant: DAINICHISEIKA COLOR & CHEMICALS MFG. CO., LTD., Tokyo (JP)

(72) Inventors: Kazuaki Muto, Tokyo (JP); Ryohei Ino, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/860,460

(22) PCT Filed: Apr. 7, 2023

(86) PCT No.: PCT/JP2023/014361
§ 371 (c)(1),
(2) Date: Feb. 7, 2025

(87) PCT Pub. No.: WO2023/210300
PCT Pub. Date: Nov. 2, 2023

(65) Prior Publication Data
US 2025/0163201 A1 May 22, 2025

(30) Foreign Application Priority Data
Apr. 28, 2022 (JP) ................. 2022-074950

(51) Int. Cl.
*C08G 18/08* (2006.01)
*C08G 18/10* (2006.01)
*C08G 18/12* (2006.01)
*C08G 18/32* (2006.01)
*C08G 18/34* (2006.01)
*C08G 18/44* (2006.01)
*C08G 18/48* (2006.01)
*C08G 18/66* (2006.01)
(Continued)

(52) U.S. Cl.
CPC ..... *C08G 18/0866* (2013.01); *C08G 18/0823* (2013.01); *C08G 18/10* (2013.01); *C08G 18/12* (2013.01); *C08G 18/3271* (2013.01); *C08G 18/348* (2013.01); *C08G 18/44* (2013.01); *C08G 18/4854* (2013.01); *C08G 18/6659* (2013.01); *C08G 18/6692* (2013.01); *C08G 18/722* (2013.01); *C08G 18/73* (2013.01); *C08G 18/755* (2013.01); *C09D 5/02* (2013.01); *C09D 175/08* (2013.01); *C09J 175/06* (2013.01); *C09J 175/08* (2013.01); *D06N 3/14* (2013.01); *D06N 3/146* (2013.01); *D06N 3/148* (2013.01); *C09D 171/00* (2013.01)

(58) Field of Classification Search
CPC .... C08G 18/0866; C08G 18/10; C08G 18/44; C08G 18/0823; C08G 18/12; C08G 18/3271; C08G 18/348; C08G 18/4854; C08G 18/6659; C08G 18/6692; C08G 17/722; C08G 18/755; C08G 18/73; C09D 175/08; C09D 171/00; C09D 5/02; C09J 175/08; C09J 175/06; D06N 3/148; D06N 3/14; D06N 3/146
See application file for complete search history.

(56) References Cited

U.S. PATENT DOCUMENTS

2009/0264577 A1 10/2009 Blum et al.
2021/0130532 A1 5/2021 Avtomonov et al.
(Continued)

FOREIGN PATENT DOCUMENTS

CN 103382253 11/2013
CN 113574129 10/2021
(Continued)

OTHER PUBLICATIONS

First Chinese Office Action, issued in the corresponding Chinese patent application No. 202380036126.1 dated Jan. 25, 2025, 12 pages with the translation.
(Continued)

*Primary Examiner* — Rabon A Sergent
(74) *Attorney, Agent, or Firm* — HSML P.C.

(57) ABSTRACT

There is provided an aqueous polyurethane dispersion that makes it possible to prepare an adhesive, a paint, and the like capable of forming an adhesion layer as a cured film whose physical properties such as strength are unlikely to be changed even by a change in temperature, the aqueous polyurethane dispersion having excellent storage stability. The aqueous polyurethane dispersion is an aqueous polyurethane dispersion containing: resin particles formed with a polyurethane having a hydroxy group at a terminal thereof; and water as a dispersion medium, wherein the polyurethane has a structure derived from a urethane prepolymer, the urethane prepolymer has a constituent unit derived from a polyol containing a polyether polyol; a constituent unit derived from a polyisocyanate containing an aliphatic polyisocyanate and an alicyclic polyisocyanate; and a constituent unit derived from an acidic group-containing polyol, the polyurethane has an acid value of 30 mgKOH/g or lower, the polyol further contains a polycarbonate polyol, and the mass ratio of the polyether polyol (C) to the polycarbonate polyol (D), (C):(D), is 20:80 to 95:5.

11 Claims, 2 Drawing Sheets

(51) Int. Cl.
- *C08G 18/72* (2006.01)
- *C08G 18/73* (2006.01)
- *C08G 18/75* (2006.01)
- *C09D 5/02* (2006.01)
- *C09D 171/00* (2006.01)
- *C09D 175/08* (2006.01)
- *C09J 175/06* (2006.01)
- *C09J 175/08* (2006.01)
- *D06N 3/14* (2006.01)

(56) References Cited

U.S. PATENT DOCUMENTS

| | | | |
|---|---|---|---|
| 2022/0025104 A1* | 1/2022 | Tseng | ............ C08G 18/758 |
| 2022/0185942 A1 | 6/2022 | Watanabe | |

FOREIGN PATENT DOCUMENTS

| | | | | |
|---|---|---|---|---|
| EP | 3599254 | | 1/2020 | |
| JP | 2000-119511 | | 4/2000 | |
| JP | 2000119511 A | * | 4/2000 | ......... C08G 18/0823 |
| JP | 2001-115090 | | 4/2001 | |
| JP | 2005-330339 | | 12/2005 | |
| JP | 2011-518899 | | 6/2011 | |
| JP | 2011-157527 | | 8/2011 | |
| JP | 2013-253159 | | 12/2013 | |
| JP | 2020-083902 | | 6/2020 | |
| JP | 2020-143231 | | 9/2020 | |
| KR | 10-2009-0085805 | | 8/2009 | |
| WO | 2019/221087 | | 11/2019 | |
| WO | 2019/238760 | | 12/2019 | |
| WO | 2020/129605 | | 6/2020 | |
| WO | 2021/172485 | | 9/2021 | |

OTHER PUBLICATIONS

First Chinese Office Action, issued in the Chinese patent application No. 202380036125.7, dated Jan. 25, 2025, 10 pages with the translation.

International Search Report and Written Opinion, issued in the corresponding PCT application No. PCT/JP2023/014361, dated Jun. 13, 2023, 14 pages with the machine translation.

Lee et al., "High solid and high stability waterborne polyurethanes via ionic groups in soft segments and chain termini", Journal of Colloid and Interface Science, vol. 336, No. 1, 2009, pp. 208-214.

Japanese Notice of Reasons for Refusal, issued in the corresponding Japanese Patent application No. 2022-074950, dated Aug. 2, 2022, 19 pages with the machine translation.

Japanese Notice of Reasons for Revocation, issued in the corresponding Japanese Patent application No. 2022-074950, dated Oct. 3, 2023, 20 pages with the machine translation.

Japanese Decision on Opposition, issued in the corresponding Japanese Patent No. JP7198380, dated Feb. 29, 2024, 39 pages with the machine translation.

International Search Report and Written Opinion, issued in the related PCT application No. PCT/JP2023/014360, dated Jun. 13, 2023, 13 pages with the machine translation.

Japanese Notice of Reasons for Refusal, issued in the corresponding Japanese Patent application No. 2022-074951, dated Aug. 9, 2022, 17 pages with the machine translation.

Extended European Search Report (EESR), issued in the corresponding European patent application No. 23796046.3, dated Sep. 3, 2025, 8 pages.

* cited by examiner

POLYURETHANE AQUEOUS DISPERSION, ADHESIVE, SYNTHETIC LEATHER AND PAINT

TECHNICAL FIELD

The present invention relates to an aqueous polyurethane dispersion, an adhesive, synthetic leather, and a paint.

BACKGROUND ART

Polyurethane-based resins are resins having excellent physical properties such as abrasion resistance, bendability, flexibility, softness, processability, adhesion, and chemical resistance, and also having excellent suitability for various processing methods. For this reason, polyurethane-based resins are widely used as: materials for synthetic leather (general term of artificial leather and synthetic leather); and binders for various coating agents, inks, paints, and the like; or as materials for films, sheets, and various shaped products, and polyurethane-based resins suitable for various applications have been proposed.

Among others, aqueous dispersions of a hydrophilic polyurethane resin that enables emulsification/dispersion in water, when dried after coating, make it possible to form a film having excellent performance, such as mechanical properties, durability, chemical resistance, and abrasion resistance. For this reason, such aqueous dispersions of a hydrophilic polyurethane resin (aqueous polyurethane dispersions) are widely used for paints, adhesives, fiber processing-and-treatment agents, paper treatment agents, inks, and the like. In the past, solvent-based liquid compositions and the like obtained by dissolving a polyurethane resin in an organic solvent have been used for these applications such as paints. However, in order to cope with environmental problems and the like, solvent-based compositions are being switched to aqueous dispersions in recent years.

Various aqueous polyurethane resin dispersion are known according to required properties. For example, there have been proposed: a dispersion of an aqueous polyurethane resin having a structure derived from a hydroxy group-containing polyamine or a hydroxy group-containing monoamine; and a coating agent composition using the same, and the like (Patent Literature 1). In addition, there have been proposed: a hydroxy functional polyurethane obtained by reacting an NCO functional prepolymer with an aminoalcohol component; and a paint, a coating material, or the like using the same (Patent Literature 2). Further, there has been proposed an aqueous paint composition containing an anionic urethane resin emulsion having an acid value of 20 to 50 mgKOH/g (Patent Literature 3).

CITATION LIST

Patent Literature

Patent Literature 1: Japanese Patent Laid-Open No. 2020-83902
Patent Literature 2: Japanese Translation of PCT International Application Publication No. 2011-518899
Patent Literature 3: Japanese Patent Laid-Open No. 2005-330339

SUMMARY OF INVENTION

Technical Problem

However, the polyurethane resin dispersions and the like proposed in Patent Literatures 1 to 3 cannot necessarily be said to exhibit good storage stability because the viscosities thereof are likely to increase with time. These polyurethane resin dispersions and the like can be used as an adhesive by combining them with a curing agent. However, a cured film (adhesion layer) formed using such an adhesive has a large difference in physical properties such as strength between under a normal temperature condition and under a low temperature condition, and therefore these polyurethane resin dispersions and the like cannot necessarily be said to be suitable as a material for forming an article (for example, synthetic leather to be used in a cold district) to be exposed to changes in temperature.

The present invention has been completed in view of such problems of the conventional techniques, and an object of the present invention is to provide an aqueous polyurethane dispersion that makes it possible to prepare an adhesive, a paint, and the like capable of forming an adhesion layer as a cured film whose physical properties such as strength are unlikely to be changed even by a change in temperature, the aqueous polyurethane dispersion having excellent storage stability. Another object of the present invention is to provide an adhesive, synthetic leather, and a paint using this aqueous polyurethane dispersion.

Solution to Problem

Specifically, according to the present invention, an aqueous polyurethane dispersion described below.
[1] An aqueous polyurethane dispersion containing:
  resin particles formed with a polyurethane having a hydroxy group at a terminal thereof; and
  water as a dispersion medium, wherein
  the polyurethane has a structure derived from a urethane prepolymer,
  the urethane prepolymer has a constituent unit derived from a polyol containing a polyether polyol; a constituent unit derived from a polyisocyanate containing an aliphatic polyisocyanate and an alicyclic polyisocyanate; and a constituent unit derived from an acidic group-containing polyol,
  the polyurethane has an acid value of 30 mgKOH/g or lower,
  the polyol further contains a polycarbonate polyol, and
  the mass ratio of the polyether polyol (C) to the polycarbonate polyol (D), (C):(D), is 20:80 to 95:5.
[2] The aqueous polyurethane dispersion according to [1], wherein
  the urethane prepolymer is a reaction product having an isocyanate group at a terminal thereof, the reaction product obtained by reacting the polyisocyanate and the polyol in a ratio of an isocyanate group (NCO group) in the polyisocyanate to a hydroxy group (OH group) in the polyol, [NCO group/OH group (molar ratio)], of larger than 1, and
  the polyurethane is a reaction product obtained by reacting the urethane prepolymer and an alkanolamine.
[3] The aqueous polyurethane dispersion according to [2], wherein the polyurethane is a reaction product obtained by reacting 10 mol % or more of the alkanolamine based on the amount of isocyanate group in the urethane prepolymer.
[4] The aqueous polyurethane dispersion according to [2] or [3], wherein the alkanolamine is an alkanolmonoamine.
[5] The aqueous polyurethane dispersion according to any one of [2] to [4], wherein the urethane prepolymer is a reaction product obtained by reacting the polyisocyanate and the polyol in a ratio of the isocyanate group (NCO group) in the polyisocyanate to the hydroxy group (OH group) in the polyol, [NCO group/OH group (molar ratio)], of larger than 1 and 1.7 or smaller.

[6] The aqueous polyurethane dispersion according to any one of [1] to [5], wherein the molar ratio of the aliphatic polyisocyanate (A) to the alicyclic polyisocyanate (B), (A):(B), is 10:90 to 90:10.

[7] The aqueous polyurethane dispersion according to any one of [1] to [6], wherein the mass ratio of the polyether polyol (C) to the polycarbonate polyol (D), (C):(D), is 25:75 to 90:10.

[8] The aqueous polyurethane dispersion according to any one of [1] to [7], wherein the resin particles have a cumulative 50% particle size ($D_{50}$) of 5 to 500 nm in the particle size distribution on a volume basis.

In addition, according to the present invention, an adhesive, synthetic leather, and a paint each described below are provided.

[9] An adhesive containing:
the aqueous polyurethane dispersion according to any one of [1] to [8]; and
an isocyanate-based curing agent.

[10] Synthetic leather including an adhesion layer formed with the adhesive according to [9].

[11] A paint containing the aqueous polyurethane dispersion according to any one of [1] to [8].

Advantageous Effects of Invention

The present invention can provide an aqueous polyurethane dispersion that makes it possible to prepare an adhesive, a paint, and the like capable of forming an adhesion layer as a cured film whose physical properties such as strength are unlikely to be changed even by a change in temperature, the aqueous polyurethane dispersion having excellent storage stability. In addition, the present invention can provide an adhesive, synthetic leather, and a paint using this aqueous polyurethane dispersion.

DESCRIPTION OF EMBODIMENTS

<Aqueous Polyurethane Dispersion>

Hereinafter, embodiments of the present invention will be described, but the present invention is not limited to the following embodiments. One embodiment of an aqueous polyurethane dispersion of the present invention contains: resin particles formed with a polyurethane having a hydroxy group at a terminal thereof; and water as a dispersion medium. The polyurethane has a structure derived from a urethane prepolymer. The urethane prepolymer has a constituent unit derived from a polyol containing a polyether polyol; a constituent unit derived from a polyisocyanate containing an aliphatic polyisocyanate and an alicyclic polyisocyanate; and a constituent unit derived from an acidic group-containing polyol. The polyurethane has an acid value of 30 mgKOH/g or lower. Hereinafter, details on the aqueous polyurethane dispersion of the present embodiment will be described.

(Polyurethane)

The aqueous polyurethane dispersion of the present embodiment contains resin particles (polyurethane resin particles) formed with a polyurethane having a structure derived from a urethane prepolymer. That is, the aqueous polyurethane dispersion of the present embodiment is an aqueous dispersion in which the polyurethane resin particles are dispersed in an aqueous dispersion medium containing water.

[Polyol]

The urethane prepolymer has a constituent unit derived from a polyol. The polyol is a compound having two or more hydroxy groups (OH groups) in one molecule. A polyol derived from biomass can also be used taking an environmental load and the like into consideration.

The polyol (excluding "acidic group-containing polyol" to be described later) contains a polyether polyol. The polyether polyol is a polyol having an ether bond in the molecule thereof. Examples of the polyether polyol include polyethylene glycol, polypropylene glycol, polyethylene glycol-polytetramethylene ether glycol (block or random), polytetramethylene ether glycol, and polyhexamethylene ether glycol. Among others, the polyether polyol is preferably polytetramethylene ether glycol (poly(oxytetramethylene) glycol). These polyethers can be used singly, or two or more of these polyethers can be used in combination.

The number average molecular weight of the polyether polyol is preferably 500 to 3,000, more preferably 900 to 2,100. When the number average molecular weight of the polyether polyol is too small, the softness may be somewhat deficient, and cold resistance may be insufficient. On the other hand, when the number average molecular weight of the polyether polyol is too large, the solvent resistance or the long-term heat resistance may be deteriorated.

The polyol may further contain an additional polyol other than the polyether polyol. Examples of the additional polyol include a polycarbonate polyol and a polyester polyol. Among others, a polycarbonate polyol is preferably used, that is, the polyol preferably further contains a polycarbonate polyol because it is made possible to form an adhesion layer having improved solvent resistance and long-term heat resistance.

When the polyol contains a polyether polyol and a polycarbonate polyol, the mass ratio of the polyether polyol (C) to the polycarbonate polyol (D), (C):(D), is preferably 20:80 to 95:5, more preferably 25:75 to 90:10, particularly preferably 35:65 to 80:20. The use of the polyether polyol and the polycarbonate polyol in the above-described mass ratio makes it possible to prepare an aqueous polyurethane dispersion that enables preparation of a paint capable of forming a cured film having excellent abrasion resistance and cold-resistant bendability.

The polycarbonate polyol is preferably a polycarbonate polyol having: a structure derived from at least any one of a diol represented by the following formula (1) and a diol represented by the following formula (2); and a carbonate bond. Note that the polycarbonate polyols can be used singly, or two or more of the polycarbonate polyols can be used in combination.

$$HO-A_1-OH \qquad (1)$$

$$HO-A_2-OH \qquad (2)$$

In the formula (1), $A_1$ represents a 2-12C divalent aliphatic hydrocarbon group. The 2-12C divalent aliphatic hydrocarbon group is preferably a tetramethylene group, a pentamethylene group, or a hexamethylene group. In the formula (2), $A_2$ represents a 6-18C divalent alicyclic hydrocarbon group. The 6-18C divalent alicyclic hydrocarbon group is preferably a 1,4-cyclohexanedimethylene group.

The diol represented by formula (1) is preferably ethylene glycol, propanediol, butanediol, pentanediol, hexanediol, heptanediol, octanediol, nonanediol, decanediol, undecanediol, or dodecanediol, more preferably 2-methyl-1,3-propanediol, 1,4-butanediol, 1,5-pentanediol, or 1,6-hexanediol. These diols can be used singly, or two or more of these diols can be used in combination.

The diol represented by formula (2) is preferably 1,3-cyclohexanediol, 1,4-cyclohexanediol, or 1,4-cyclohexanedimethanol, more preferably 1,4-cyclohexanedimethanol. These diols can be used singly, or two or more of these diols can be used in combination.

Examples of the polyester polyol include: poly(ethylene adipate), dihydroxy terminated; poly(butylene adipate), dihydroxy terminated; poly(ethylene butylene adipate), dihydroxy terminated; poly(hexamethylene isophthalate adipate), dihydroxy terminated; poly(ethylene succinate), dihydroxy terminated; poly(butylene succinate), dihydroxy terminated; poly(ethylene sebacate), dihydroxy terminated; poly(butylene sebacate), dihydroxy terminated; poly-ε-caprolactone diol; poly(3-methyl-1,5-pentylene adipate), dihydroxy terminated; and a polycondensation product of 1,6-hexanediol and dimer acid.

[Polyisocyanate]

The urethane prepolymer has a constituent unit derived from a polyisocyanate. The polyisocyanate is a compound having two or more isocyanate groups (NCO groups) in one molecule. The polyisocyanate contains an aliphatic polyisocyanate and an alicyclic polyisocyanate. That is, the urethane prepolymer has both a constituent unit derived from an aliphatic polyisocyanate and a constituent unit derived from an alicyclic polyisocyanate.

The use of the alicyclic polyisocyanate makes it possible to lower the cohesion force of the polyurethane to be obtained. This makes the cohesion among the resin particles (emulsion particles) unlikely to occur and suppresses an increase in the viscosity of the aqueous polyurethane dispersion with time, so that the storage stability can be improved. However, when only the alicyclic polyisocyanate is used without using it in combination with the aliphatic polyisocyanate, a change in the physical properties of the cured film (adhesion layer) depending on the temperature is likely to occur, so that the cold resistance is deteriorated. In contrast, the use of the aliphatic polyisocyanate and the alicyclic polyisocyanate in combination makes it possible to improve the storage stability of the aqueous polyurethane dispersion and make a change in a physical property of the cured film (adhesion layer) to be formed with an adhesive using this aqueous polyurethane dispersion depending on the temperature unlikely to occur.

The aliphatic polyisocyanate (excluding the alicyclic polyisocyanate) is an isocyanate compound having a linear or branched alkyl group. Examples of the aliphatic polyisocyanate include ethylene diisocyanate, tetramethylene diisocyanate, pentamethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate.

The alicyclic polyisocyanate is an isocyanate compound having a cycloalkyl group. Examples of the alicyclic polyisocyanate include isophorone diisocyanate (IPDI), 4,4'-dicyclohexylmethane diisocyanate (H12-MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate, and 2,6-norbornane diisocyanate.

In the polyisocyanate, the molar ratio of the aliphatic polyisocyanate (A) to the alicyclic polyisocyanate (B), (A):(B), is preferably 10:90 to 90:10, more preferably 30:70 to 70:30. When the proportion of the aliphatic polyisocyanate in the polyisocyanate is excessive, a change in a physical property of the cured film (adhesion layer) to be formed depending on the temperature is more unlikely to occur, but on the other hand, the storage stability of the aqueous polyurethane dispersion may be somewhat deteriorated.

[Acidic Group-Containing Polyol]

The urethane prepolymer has a structural unit derived from an acidic group-containing polyol. The acidic group-containing polyol is a polyol having one or more acidic groups in one molecule. For this reason, the polyurethane is a resin having an acidic group in the molecule thereof and having an acid value within a predetermined range. Examples of the acidic group include a carboxylate group, a sulfonate group, a phosphate group, and a phenolic hydroxy group. Examples of the acidic group-containing polyol include dimethylol alkanoic acids such as 2,2-dimethylol propionic acid and 2,2-dimethylol butanoic acid, N,N-bis(hydroxyethyl) glycine, N,N-bis(hydroxyethyl) alanine, 3,4-dihydroxybutanesulfonic acid, and 3,6-dihydroxy-2-toluenesulfonic acid. Among others, from the viewpoint of easy availability, the acidic group-containing polyol is preferably a 4-12C alkanoic acid (dimethylol alkanoic acid) containing two methylol groups, more preferably 2,2-dimethylol propionic acid (2,2-bis(hydroxymethyl)propionic acid).

[Urethane Prepolymer]

The urethane prepolymer is a reaction product that can be obtained by reacting raw material compounds containing a polyisocyanate and a polyol according to a usual method. More specifically, the urethane prepolymer is a reaction product having an isocyanate group at a terminal thereof, the reaction product obtained by reacting the polyisocyanate and the polyol in a ratio of the isocyanate group (NCO group) in the polyisocyanate to the hydroxy group (OH group) in the polyol, [NCO group/OH group (molar ratio)], of larger than 1, preferably larger than 1 and 1.7 or smaller, more preferably larger than 1.1 and 1.5 or smaller. When the value of [NCO group/OH group (molar ratio)] in reacting the polyisocyanate and the polyol is too large, the amount of the isocyanate group present at the terminals (the content of the terminal isocyanate group (NCO group)) of the urethane prepolymer to be obtained, the amount of urea, and the like are excessive. For this reason, a change in a physical property of the adhesion layer obtained by curing the polyurethane produced using this urethane prepolymer with a curing agent depending on the temperature tends to be likely to occur, and the adhesion force of the adhesion layer tends to be somewhat lowered.

The amount of the isocyanate group present at the terminals of the urethane prepolymer (the content of the terminal isocyanate group (NCO group)) is preferably 1.0 to 10.0% by mass, more preferably 1.5 to 6.0% by mass, based on the solid content of the resin. When the content of the terminal NCO group of the urethane prepolymer is too large, a change in a physical property of the adhesion layer obtained by curing the polyurethane produced using this urethane prepolymer with a curing agent depending on the temperature tends to be likely to occur, and the adhesion force of the adhesion layer tends to be somewhat lowered.

[Polyurethane]

The acid value of the polyurethane is 30 mgKOH/g or lower, preferably 3 to 27 mgKOH/g, more preferably 5 to 25 mgKOH/g, particularly preferably 15 to 25 mgKOH/g. Note that the urethane prepolymer that forms the polyurethane has a constituent unit derived from an acidic group-containing polyol, and therefore the acid value of the polyurethane is usually higher than 0 mgKOH/g. When the acid value of the polyurethane is too high, the proportion of a hard segment is excessive. For this reason, a change in a physical property of the adhesion layer obtained by curing the polyurethane with a curing agent depending on the temperature tends to be likely to occur, and the softness and adhesion force of the adhesion layer are lowered. On the other hand, when the acid value of the polyurethane is too low, the storage stability of the aqueous polyurethane dispersion is insufficient. Note that "the acid value of the polyurethane" herein is a physical property value (calculated value) calculated by the following formula (1).

$$\text{Acid value (mgKOH/g) of polyurethane} = \{(W/M) \times 56110\}/Y \quad (1)$$

W: Use amount (g) of acidic group-containing polyol
M: Molecular weight of acidic group-containing polyol
Y: Total use amount (g) of constituent materials for polyurethane A hydroxy group is present at a terminal of the molecular chain of the polyurethane. The hydroxyl value of the polyurethane is usually 0.5 to 60 mgKOH/g, preferably 2 to 45 mgKOH/g, more preferably 10 to 35 mgKOH/g. Note that "the hydroxyl value of the polyurethane" herein is a physical property value (calculated value) calculated by the following formula.

$$\text{Hydroxyl value (mgKOH/g) of polyurethane} = \{(A/B) \times C \times 56110\}/Y$$

A: Use amount (g) of alkanolamine
B: Molecular weight of alkanolamine
C: Number of hydroxy group contained in one molecule of alkanolamine
Y: Total use amount (g) of constituent materials for polyurethane The polyurethane is preferably a reaction product obtained by reacting the above-described urethane prepolymer having an isocyanate group at a terminal thereof and the alkanolamine. The alkanolamine reacts with the terminal isocyanate group of the urethane prepolymer to form a urea bond. Thereby, a polyurethane containing a urea bond and having a hydroxy group at a terminal thereof is formed.

As the alkanolamine, alkanolmonoamines, such as monoethanolamine, mono-n-butylethanolamine, N-methylethanolamine, N-ethylaminoethanol, N-tertiary-butylethanolamine, adrenalin, 2-(4-aminophenyl)ethyl alcohol, trishydroxymethylaminomethane, 2-amino-2-methyl-1-propanol, 1-amino-2-propanol, 3-amino-1,2-propanediol, 2-amino-1-butanol, 1-amino-2-butanol, and 5-amino-1-pentanol; alkanoldiamines, such as N-(β-aminoethyl)ethanolamine, 3,5-diaminobenzyl alcohol, 1,3-diamino-2-propanol, and 2,2'-(ethylenebisimino)bisethanol; and the like can be used. Among others, the alkanolamine is preferably an alkanolmonoamine, and from the viewpoint of easy availability, and the like, the alkanolamine is more preferably monoethanolamine. The use of the alkanolmonoamine makes it possible to prepare an aqueous polyurethane dispersion exhibiting storage stability and cold resistance (a characteristic that physical properties such as strength are unlikely to be changed even by a change in temperature) of the adhesion layer to be formed in more excellent balance. In contrast, when the alkanoldiamine is used, the storage stability of the aqueous polyurethane dispersion to be obtained tends to be somewhat deteriorated.

The polyurethane is a reaction product obtained by reacting preferably 1 to 100 mol %, more preferably 5 to 95 mol %, particularly preferably 25 to 70 mol %, most preferably 40 to 60 mol %, of the alkanolamine based on the amount of the isocyanate group in the urethane prepolymer. Controlling the amount of the alkanolamine to be reacted within the above range makes it possible to further improve the storage stability and prepare an aqueous polyurethane dispersion that enables preparation of an adhesive capable of forming an adhesion layer having excellent solvent resistance, heat resistance, and the like. When the amount of the alkanolamine to be reacted is too small, the degree of crosslinking may be somewhat lowered, the netlike structure to be formed may be insufficient, or the amount of the hydroxy group to be introduced at the terminals of the polyurethane may be somewhat deficient. On the other hand, when the amount of the alkanolamine to be reacted is too large, a defect may be likely to occur due to the unreacted alkanolamine, or the physical properties may be likely to be changed due to a change in temperature.

In the aqueous polyurethane dispersion, the resin particles preferably have a cumulative 50% particle size ($D_{50}$) of 5 to 500 nm, more preferably 10 to 450 nm, particularly preferably 50 to 350 nm, in the particle size distribution on a volume basis. When the resin particles have a $D_{50}$ (median size) of smaller than 5 nm, the viscosity of the aqueous dispersion may excessively increase. On the other hand, the resin particles having a $D_{50}$ (median size) of larger than 500 nm may be likely to settle down.

The content of the resin particles in the aqueous polyurethane dispersion is preferably 5 to 70% by mass, more preferably 10 to 60% by mass, based on the total amount of the aqueous dispersion.

(Dispersion Medium)

The aqueous polyurethane dispersion of the present embodiment is an aqueous dispersion in which the resin particles of the polyurethane are dispersed in an aqueous dispersion medium containing water. As the water, ion-exchanged water, distilled water, pure water, ultrapure water, and the like can be used. Among others, ion-exchanged water is preferable from the viewpoint of dispersion stability of the resin particles. The aqueous dispersion medium may further contain an organic solvent within a range where the dispersibility and stability of the resin particles are not deteriorated. Examples of the organic solvent include acetone, methyl ethyl ketone, methyl isobutyl ketone, tetrahydrofuran, dioxane, dimethylformamide, dimethyl sulfoxide, N-methylpyrrolidone, N-ethylpyrrolidone, S-alkoxypropionamide, dipropylene glycol dimethyl ether, and ethyl acetate.

(Method for Producing Aqueous Polyurethane Dispersion)

The aqueous polyurethane dispersion of the present embodiment can be produced by the same methods as the conventionally known methods for producing an aqueous dispersion of resin particles composed of a polyurethane. Specifically, the aqueous polyurethane dispersion to be a target can be obtained by, for example, a prepolymer method in which a urethane prepolymer having an isocyanate group at a terminal thereof is prepared and then an alkanolamine that functions as a chain extender is reacted with the urethane prepolymer.

The method for producing an aqueous polyurethane dispersion by the prepolymer method includes, for example, a step (1) of reacting a polyol, a polyisocyanate, and an acidic group-containing polyol to obtain a urethane prepolymer; and a step (2) of neutralizing the acidic groups in the obtained urethane prepolymer with a neutralizer and then reacting an alkanolamine with the neutralized urethane prepolymer to form a polyurethane; and a step (3) of dispersing resin particles of the formed polyurethane in a dispersion medium containing water.

The neutralizer for neutralizing the acidic groups in the urethane prepolymer may appropriately be selected according to the type of the acidic groups, and the like. Examples of the neutralizer include organic amines, such as trimethylamine, triethylamine, triisopropylamine, and tributylamine; inorganic alkalis, such as sodium hydroxide and potassium hydroxide; and ammonia. Among others, the neutralizer is preferably an organic amine, more preferably triethylamine.

<Adhesive>

One embodiment of an adhesive of the present invention contains the above-described aqueous polyurethane dispersion and an isocyanate-based curing agent. The adhesive of the present embodiment contains the above-described aqueous polyurethane dispersion and therefore is capable of forming an adhesion layer that is a cured film whose physical properties such as strength are unlikely to be changed even by a change in temperature. For this reason, the adhesive of the present embodiment is suitable as an adhesive for producing synthetic leather and various laminates.

As the isocyanate-based curing agent, conventionally known isocyanate-based curing agents can be used. Examples of commercially available isocyanate-based curing agents include: by trade names, DURANATE WT30-100, DURANATE WB40-100, DURANATE WL70-100, and DURANATE WR80-70P (all manufactured by Asahi Kasei Corporation); AQUANATE 105, AQUANATE 130, AQUANATE 140, AQUANATE 200, and AQUANATE 210 (all manufactured by Tosoh Corporation); and TAKENATE WD-725, TAKENATE WD-730, and TAKENATE WD-726 (all manufactured by Mitsui Chemicals, Inc.).

The content of the isocyanate-based curing agent in the adhesive may appropriately be set according to the purpose. Specifically, the content of the isocyanate-based curing agent in the adhesive is preferably 1 to 50 parts by mass, more preferably 10 to 40 parts by mass, based on 100 parts by mass of the polyurethane (solid content).

In the adhesive of the present embodiment, various additives, such as a thermoplastic resin, a tackifier resin, a catalyst, a pigment, an antioxidant, an ultraviolet absorber, a surfactant, a flame retardant, a filler, and a foaming agent, can be blended in an appropriate amount as necessary.

Adherends can easily be bonded by applying the adhesive of the present embodiment on a surface of the adherend. Examples of the adherend other than the substrate layer for the above-described synthetic leather include substrates of metals or nonmetals (such as polycarbonate and glass).

<Synthetic Leather>

One embodiment of synthetic leather of the present invention includes an adhesion layer formed with the above-described adhesive. The adhesive that forms the adhesion layer contains the above-described aqueous polyurethane dispersion, and therefore the physical properties such as strength are unlikely to be changed even by a change in temperature. For this reason, the synthetic leather of the present embodiment including this adhesion layer has excellent cold resistance because the physical properties such as strength are unlikely to be changed even by a change in temperature.

The synthetic leather includes, for example, a skin layer, an adhesion layer provided on the skin layer, and a substrate layer of base cloth or the like, the substrate layer provided on the adhesion layer. Examples of the base cloth that forms the substrate layer include: fabric composed of twill weave, plane weave, or the like; napped cloth obtained by mechanically napping cotton cloth of the fabric; rayon cloth; nylon cloth; polyester cloth; Kevlar® cloth; nonwoven fabrics (polyester, nylon, various latexes); and various films and sheets. Examples of the skin layer include those formed with a skin layer forming paint of a solvent-based polyurethane, an aqueous polyurethane, TPU, or the like.

The synthetic leather can be produced in the following manner for example. First, a skin layer forming paint for forming a skin layer is applied on release paper by a known method such as comma coating, knife coating, roll coating, gravure coating, die coating, or spray coating. The applied paint is appropriately dried to form a skin layer, and then the above-described adhesion is applied on the formed skin layer by a known method such as comma coating, knife coating, or roll coating. The applied adhesive and a substrate layer are compression-bonded and then subjected to aging or the like under predetermined conditions. Subsequently, the release paper is released, and thus the synthetic leather as a target can be obtained. The synthetic leather of the present embodiment is suitable as a material for forming shoes, clothes, bags, furniture, interior materials for vehicles (for example, instrument panels, doors, consoles, and seats), and the like.

<Paint>

One embodiment of a paint of the present invention contains the above-described aqueous polyurethane dispersion. The paint of the present embodiment contains the above-described aqueous polyurethane dispersion, and therefore when the paint of the present embodiment is applied on a surface to be coated and then subjected to aging or the like as necessary, thereby a cured film (film) whose physical properties such as strength are unlikely to be changed even by a change in temperature, the cured film (film) having excellent cold resistance, can be formed. For this reason, the paint of the present embodiment is useful as a coating agent for coating surfaces of various substrates to be coated.

When the physical properties such as mechanical properties and durability of a cured film (film) to be formed are intended to be improved, the paint preferably further contains a curing agent (hereinafter, also referred to as "crosslinking agent"). Examples of the crosslinking agent include isocyanate-based crosslinking agents, carbodiimide-based crosslinking agents, oxazoline-based crosslinking agents, and epoxy-based crosslinking agents.

When the content of the crosslinking agent in the paint is too large, a defect such as plasticization or embrittlement of the film may occur due to the unreacted crosslinking agent. For this reason, the content (in terms of solid content) of the crosslinking agent in the paint is preferably 40 parts by mass or less, more preferably 0.5 to 35 parts by mass, based on 100 parts by mass of the polyurethane resin.

The paint can further contain various additives as necessary. Examples of the additives include: matting agents;

antioxidants, such as hindered phenol-based, phosphite-based, and thioether-based antioxidants; light stabilizers, such as hindered amine-based light stabilizers; ultraviolet absorbers, such as benzophenone-based and benzotriazole-based ultraviolet absorbers; stabilizers against discoloration by gas, such as hydrazine-based stabilizers; and metal deactivators.

Examples of the matting agents include resin particles, silica particles, talc, aluminum hydroxide, calcium sulfate, calcium silicate, calcium carbonate, magnesium carbonate, barium carbonate, alumina silicate, a molecular sieve, kaolin, and mica. The use of the paint containing a matting agent makes it possible to form a film such as a matte skin material.

EXAMPLES

Hereinafter, the present invention will specifically be described based on Examples, but the present invention is not limited to these Examples. Note that "parts" and "%" in Examples and Comparative Examples are each on a mass basis unless otherwise noted.

<Preparation of Materials>
The materials described below were prepared.
Polyether polyol (1): poly(oxytetramethylene) glycol, number average molecular weight 2,000
Polyether polyol (2): poly(oxytetramethylene) glycol, number average molecular weight 1,000
Polyether polyol (3): poly(oxytetramethylene) glycol, number average molecular weight 3,500
Polyether polyol (4): poly(oxytetramethylene) glycol, number average molecular weight 250
Polycarbonate polyol: polyhexamethylene carbonate diol, trade name "ETERNACOLL UH-100," manufactured by UBE Corporation, number average molecular weight 1,000
HDI: hexamethylene diisocyanate
IPDI: isophorone diisocyanate
BisMPA: 2,2-bis(hydroxymethyl) propionic acid
MEA: monoethanolamine
MBM: mono-n-butylethanolamine
EA: N-(β-aminoethyl)ethanolamine
TEA: triethylamine
MEK: methyl ethyl ketone <Production of Aqueous Polyurethane Dispersion>

Example 1

In a reaction container equipped with a stirrer, a thermometer, a gas introducing tube, and a reflux condenser, 150 parts of polyether polyol (2), 150 parts of the polycarbonate polyol, 22.1 parts of BisMPA, 28.2 parts of HDI, and 86.8 parts of IPDI were placed. MEK was added thereto so as to make the solid content 30%, and the resultant mixture was dissolved uniformly and then reacted at 60° C. for 7 hours. After the content of the isocyanate group (NCO group) was confirmed to reach a predetermined value, the reaction solution was cooled to room temperature. To the reaction solution, 16.7 parts of TEA was added, and the resultant mixture was stirred to obtain a liquid containing a urethane prepolymer. The content of the terminal NCO group of the urethane prepolymer in the obtained liquid was 0.54% (1.8% based on the solid content of the resin). The content of the terminal NCO group of the urethane prepolymer was determined by calculation in such a way that the terminal NCO group of the urethane prepolymer was reacted with an excessive amount of dibutylamine and then the amount of residual dibutylamine was titrated with hydrochloric acid.

To the obtained liquid, 5.7 parts of MEA was added, and the resultant mixture was stirred and reacted. After an appropriate amount of water was added thereto to conduct emulsification, MEK was removed by vacuum degassing to obtain an aqueous polyurethane dispersion (solid content 30%) containing polyurethane resin particles. The polyurethane forming the polyurethane resin particles had an acid value of 20.0 mgKOH/g and a hydroxyl value of 11.4 mgKOH/g. The polyurethane resin particles had an average particle size ($D_{50}$) of 200 nm, as measured using a laser diffraction/scattering particle size distribution analyzer.

Examples 2, 3, 5 to 18, Reference Example 4, and Comparative Examples 1 to 7

An aqueous polyurethane dispersion (solid content 30%) containing polyurethane resin particles was obtained in the same manner as in Example 1, described above, except that the combination as shown in Tables 1-1 to 1-3 was employed. In Comparative Example 4, emulsification was conducted adding a surfactant (a nonionic polyoxyalkylene ether, trade name "Pionin D-1110DIR," manufactured by TAKEMOTO OIL & FAT CO., LTD.) in an amount of 10% based on the solid content of the resin in place of the acidic group-containing polyol (BisMPA). Physical properties and the like are shown in Tables 1-1 to 1-3.

TABLE 1-1

| | | | Examples | | | Reference Example | Examples | | | | |
|---|---|---|---|---|---|---|---|---|---|---|---|
| | | | 1 | 2 | 3 | 4 | 5 | 6 | 7 | 8 | 9 |
| Urethane prepolymer | Polyol (parts) | Polyether polyol (1) | | | | | | | | | |
| | | Polyether polyol (2) | 150 | 90 | 210 | 300 | 150 | 150 | 150 | 150 | 150 |
| | | Polyether polyol (3) | | | | | | | | | |
| | | Polyether polyol (4) | | | | | | | | | |
| | | Polycarbonate polyol | 150 | 210 | 90 | | 150 | 150 | 150 | 150 | 150 |

TABLE 1-1-continued

|  |  |  | Examples | | | Reference Example | Examples | | | | |
| --- | --- | --- | --- | --- | --- | --- | --- | --- | --- | --- | --- |
|  |  |  | 1 | 2 | 3 | 4 | 5 | 6 | 7 | 8 | 9 |
|  | Polyisocyanate (parts) | HDI | 28.2 | 28.2 | 28.2 | 28.2 | 28.0 | 28.2 | 28.0 | 42.3 | 51.8 |
|  |  | IPDI | 86.8 | 86.8 | 86.8 | 86.8 | 86.2 | 87.1 | 86.2 | 130.5 | 159.6 |
|  | Acidic group-containing polyol (parts) | BisMPA | 22.1 | 22.1 | 22.1 | 22.1 | 21.7 | 22.3 | 21.8 | 25.9 | 28.5 |
|  | Polyether polyol/polycarbonate polyol (mass ratio) |  | 50/50 | 30/70 | 70/30 | 100/0 | 50/50 | 50/50 | 50/50 | 50/50 | 50/50 |
|  | Aliphatic polyisocyanate/alicyclic polyisocyanate (molar ratio) |  | 30/70 | 30/70 | 30/70 | 30/70 | 30/70 | 30/70 | 30/70 | 30/70 | 30/70 |
|  | NCO group/OH group (molar ratio) |  | 1.2 | 1.2 | 1.2 | 1.2 | 1.2 | 1.2 | 1.2 | 1.7 | 2.0 |
|  | Terminal NCO group content (in terms of solid content: %) |  | 1.8 | 1.8 | 1.8 | 1.8 | 1.8 | 1.8 | 1.8 | 5.8 | 8.0 |
|  | Terminal NCO group content (%) |  | 0.54 | 0.54 | 0.54 | 0.54 | 0.53 | 0.54 | 0.53 | 1.75 | 2.39 |
| Polyurethane | Alkanolamine (parts) | MEA | 5.7 | 5.7 | 5.7 | 5.7 | 1.1 | 10.2 | 0.56 | 21.1 | 31.3 |
|  |  | MBM |  |  |  |  |  |  |  |  |  |
|  |  | EA |  |  |  |  |  |  |  |  |  |
|  | Neutralizer (parts) | TEA | 16.7 | 16.7 | 16.7 | 16.7 | 16.4 | 16.9 | 16.4 | 19.6 | 21.6 |
|  | Amount (mol %) of alkanolamine to terminal NCO group of urethane prepolymer |  | 50.0 | 50.0 | 50.0 | 50.0 | 10.0 | 90.0 | 5.0 | 50.0 | 50.0 |
|  | Acid value (mgKOH/g) |  | 20.0 | 20.0 | 20.0 | 20.0 | 20.0 | 20.0 | 20.0 | 20.0 | 20.0 |
|  | Hydroxyl value (mgKOH/g) |  | 11.4 | 11.4 | 11.4 | 11.4 | 2.2 | 20.2 | 1.1 | 35.9 | 48.6 |
|  | $D_{50}$ (nm) |  | 200 | 200 | 200 | 200 | 400 | 100 | 500 | 50 | 25 |

TABLE 1-2

|  |  |  | Examples | | | | | | | | |
| --- | --- | --- | --- | --- | --- | --- | --- | --- | --- | --- | --- |
|  |  |  | 10 | 11 | 12 | 13 | 14 | 15 | 16 | 17 | 18 |
| Urethane prepolymer | Polyol (parts) | Polyether polyol (1) |  |  |  |  |  |  | 150 |  |  |
|  |  | Polyether polyol (2) | 150 | 150 | 150 | 150 | 150 | 150 |  |  |  |
|  |  | Polyether polyol (3) |  |  |  |  |  |  |  | 150 |  |
|  |  | Polyether polyol (4) |  |  |  |  |  |  |  |  | 150 |
|  |  | Polycarbonate polyol | 150 | 150 | 150 | 150 | 150 | 150 | 150 | 150 | 150 |
|  | Polyisocyanate (parts) | HDI | 9.4 | 64.9 | 82.8 | 28.2 | 28.1 | 19 | 23.0 | 20.8 | 58.4 |
|  |  | IPDI | 111.9 | 36.7 | 12.2 | 87.1 | 86.5 | 58.6 | 71.0 | 64.3 | 179.9 |
|  | Acidic group-containing polyol (parts) | BisMPA | 22.3 | 21.3 | 20.9 | 22.3 | 21.9 | 1.9 | 20.8 | 20.3 | 28.6 |
|  | Polyether polyol/polycarbonate polyol (mass ratio) |  | 50/50 | 50/50 | 50/50 | 50/50 | 50/50 | 50/50 | 50/50 | 50/50 | 50/50 |
|  | Aliphatic polyisocyanate/alicyclic polyisocyanate (molar ratio) |  | 10/90 | 70/30 | 90/10 | 30/70 | 30/70 | 30/70 | 30/70 | 30/70 | 30/70 |
|  | NCO group/OH group (molar ratio) |  | 1.2 | 1.2 | 1.2 | 1.2 | 1.2 | 1.2 | 1.2 | 1.2 | 1.2 |
|  | Terminal NCO group content (in terms of solid content: %) |  | 1.8 | 1.8 | 1.8 | 1.8 | 1.8 | 1.4 | 1.5 | 1.4 | 2.9 |
|  | Terminal NCO group content (%) |  | 0.53 | 0.55 | 0.55 | 0.54 | 0.54 | 0.42 | 0.46 | 0.43 | 0.86 |
| Polyurethane | Alkanolamine (parts) | MEA | 5.7 | 5.6 | 5.6 |  |  | 3.8 | 4.6 | 4.2 | 11.8 |
|  |  | MBM |  |  |  | 10.9 |  |  |  |  |  |
|  |  | EA |  |  |  |  | 4.8 |  |  |  |  |
|  | Neutralizer (parts) | TEA | 16.8 | 16.1 | 15.8 | 16.9 | 16.5 | 1.4 | 15.7 | 15.3 | 21.6 |
|  | Amount (mol %) of alkanolamine to terminal NCO group of urethane prepolymer |  | 50.0 | 50.0 | 50.0 | 50.0 | 50.0 | 50.0 | 50.0 | 50.0 | 50.0 |
|  | Acid value (mgKOH/g) |  | 20.0 | 20.0 | 20.0 | 20.0 | 20.0 | 2.0 | 20.0 | 20.0 | 20.0 |
|  | Hydroxyl value (mgKOH/g) |  | 11.2 | 11.6 | 11.7 | 11.2 | 5.7 | 9.2 | 9.8 | 9.1 | 18.0 |
|  | $D_{50}$ (nm) |  | 200 | 200 | 200 | 200 | 200 | 500 | 250 | 300 | 150 |

TABLE 1-3

|  |  |  | Comparative Examples | | | | | | |
|---|---|---|---|---|---|---|---|---|---|
|  |  |  | 1 | 2 | 3 | 4 | 5 | 6 | 7 |
| Urethane prepolymer | Polyol (parts) | Polyether polyol (1) |  |  |  |  |  |  |  |
|  |  | Polyether polyol (2) | 300 |  | 150 | 150 | 150 | 150 | 150 |
|  |  | Polyether polyol (3) |  |  |  |  |  |  |  |
|  |  | Polyether polyol (4) |  |  |  |  |  |  |  |
|  |  | Polycarbonate polyol |  | 300 | 150 | 150 | 150 | 150 | 150 |
|  | Polyisocyanate (parts) | HDI |  | 28.2 | 28.0 | 18.2 | 38.9 | 92.0 |  |
|  |  | IPDI | 124.8 | 86.8 | 86.2 | 56.0 | 119.8 |  | 124.8 |
|  | Acidic group-containing polyol (parts) | BisMPA | 22.5 | 22.1 | 21.8 |  | 45.8 | 20.9 | 22.5 |
|  | Polyether polyol/polycarbonate polyol (mass ratio) |  | 100/0 | 0/100 | 50/50 | 50/50 | 50/50 | 50/50 | 50/50 |
|  | Aliphatic polyisocyanate/alicyclic polyisocyanate (molar ratio) |  | 0/100 | 30/70 | 30/70 | 30/70 | 30/70 | 100/0 | 0/100 |
|  | NCO group/OH group (molar ratio) |  | 1.2 | 1.2 | 1.2 | 1.2 | 1.2 | 1.2 | 1.2 |
|  | Terminal NCO group content (in terms of solid content: %) |  | 1.8 | 1.8 | 1.8 | 1.3 | 2.1 | 1.9 | 1.8 |
|  | Terminal NCO group content (%) |  | 0.53 | 0.54 | 0.53 | 0.40 | 0.64 | 0.56 | 0.53 |
| Polyurethane | Alkanolamine (parts) | MEA | 5.7 | 5.7 |  | 3.7 | 7.8 | 5.6 | 5.7 |
|  |  | MBM |  |  |  |  |  |  |  |
|  |  | EA |  |  |  |  |  |  |  |
|  | Neutralizer (parts) | TEA | 17 | 16.7 | 16.4 |  | 34.6 | 15.8 | 17.0 |
|  | Amount (mol %) of alkanolamine to terminal NCO group of urethane prepolymer |  | 50.0 | 50.0 | — | 50.0 | 50.0 | 50.0 | 50.0 |
|  | Acid value (mgKOH/g) |  | 20.0 | 20.0 | 20.0 | 0.0 | 35.0 | 20.0 | 20.0 |
|  | Hydroxyl value (mgKOH/g) |  | 11.2 | 11.4 | 0.0 | 8.9 | 43.5 | 11.8 | 11.2 |
|  | $D_{50}$ (nm) |  | 200 | 200 | 700 | 300 | 1 | 200 | 200 |

<Evaluations of Aqueous Polyurethane Dispersion>
(Storage Stability)

The aqueous polyurethane dispersions were stored at 10° C. for 1 month. The viscosity at 25° C. of each aqueous polyurethane dispersion after the storage was measured using a B-type viscometer (#2 rotor, 30 rpm) to evaluate the storage stability according to the evaluation criteria described below. The results are shown in Tables 2-1 and 2-2.

1 (Excellent): 150 mPa·s or lower 2 (Good): higher than 150 mPa·s and 300 mPa·s or lower 3 (Normal): higher than 300 mPa·s and 800 mPa·s or lower 4 (Allowable): higher than 800 mPa·s and 1,000 mPa·s or lower 5 (Not Allowable): higher than 1,000 mPa·s, or setting/separation occurs <Production of Adhesive and Preparation of Film>

To 100 parts of the aqueous polyurethane dispersion, 10 parts (in other words, 33.3 parts based on 100 parts of the polyurethane resin (solid content)) of an isocyanate-based curing agent (trade name "DURANATE WT30-100," manufactured by Asahi Kasei Corporation) was added, and then the resultant mixture was mixed and defoamed to obtain an adhesive. The obtained adhesive was applied on release paper and then dried at 70° C. for 3 minutes and at 100° C. for 1 minute. Further, the dried adhesive was subjected to aging at 50° C. for 24 hours for curing to obtain a film having a thickness of 30 μm.

<Evaluations of Adhesive>
(Rate of Change in Physical Property)

The prepared film was cut into a width of 15 mm and a length of 60 mm to make a specimen. The strength (100% M) of the specimen was measured using a tensile tester (trade name "Autograph AGS-500NS," manufactured by SHIMADZU CORPORATION) under a condition of a tensile speed of 200 mm/min. Temperature conditions were 25° C., −10° C., and −30° C. Rate A of change in a physical property and rate B of change in a physical property were calculated using the following mathematical formulas, and the rates of changes in the physical property were evaluated according to the evaluation criteria described below. The results are shown in Tables 2-1 and 2-2.

Rate $A$ (%) of change in physical property =
$$\{(100\% \; M \text{ at } -10° \text{ C.})/(100\% \; M \text{ at } 25° \text{ C.})\} \times 100$$

Rate $B$ (%) of change in physical property =
$$\{(100\% \; M \text{ at } -10° \text{ C.})/(100\% \; M \text{ at } 25° \text{ C.})\} \times 100$$

[Evaluation Criteria for Rate A of Change in Physical Property]

1 (Excellent): 155% or lower 2 (Good): higher than 155% and 165% or lower 3 (Normal): higher than 165% and 180% or lower 4 (Allowable): higher than 180% and 200% or lower 5 (Not Allowable): higher than 200%

[Evaluation Criteria for Rate B of Change in Physical Property]
- 1 (Excellent): 170% or lower
- 2 (Good): higher than 170% and 200% or lower
- 3 (Normal): higher than 200% and 230% or lower
- 4 (Allowable): higher than 230% and 250% or lower
- 5 (Not Allowable): higher than 250%

(Solvent Resistance)

The prepared film was cut into a width of 15 mm and a length of 60 mm to make a specimen. The specimen was immersed in acetone for 10 minutes to measure the length of the specimen before and after the immersion. The coefficient of linear swelling was calculated using the following mathematical formula, and the solvent resistance was evaluated according to the evaluation criteria described below. The results are shown in Tables 2-1 and 2-2.

$$\text{Coefficient (\%) of linear swelling} = \{(\text{length of specimen after immersion})/(\text{length of specimen before immersion})\} \times 100$$

- 1 (Excellent): 120% or lower
- 2 (Good): higher than 120% and 125% or lower
- 3 (Normal): higher than 125% and 130% or lower
- 4 (Allowable): higher than 130% and 140% or lower
- 5 (Not Allowable): higher than 140%

(Long-Term Heat Resistance)

The prepared film was cut into a width of 10 cm and a length of 10 cm to make a specimen. The specimen was held at 120° C. for 400 hours, and then the strength (100% M) of the specimen was measured using a tensile tester (trade name "Autograph AGS-500NS," manufactured by SHIMADZU CORPORATION) under a condition of a tensile speed of 200 mm/min. Temperature condition was 25° C. The rate of change was calculated using the following mathematical formula, and the long-term heat resistance was evaluated according to the evaluation criteria described below. The results are shown in Tables 2-1 and 2-2.

$$\text{Rate (\%) of change} = \{(100\% \ M \ \text{after holding})/(100\% \ M \ \text{before holding})\} \times 100$$

- 1 (Excellent): 90% or higher
- 2 (Good): 80% or higher and lower than 90%
- 3 (Normal): 70% or higher and lower than 80%
- 4 (Allowable): 60% or higher and lower than 70%
- 5 (Not Allowable): lower than 60%

(Heat Resistance)

Figure 1:
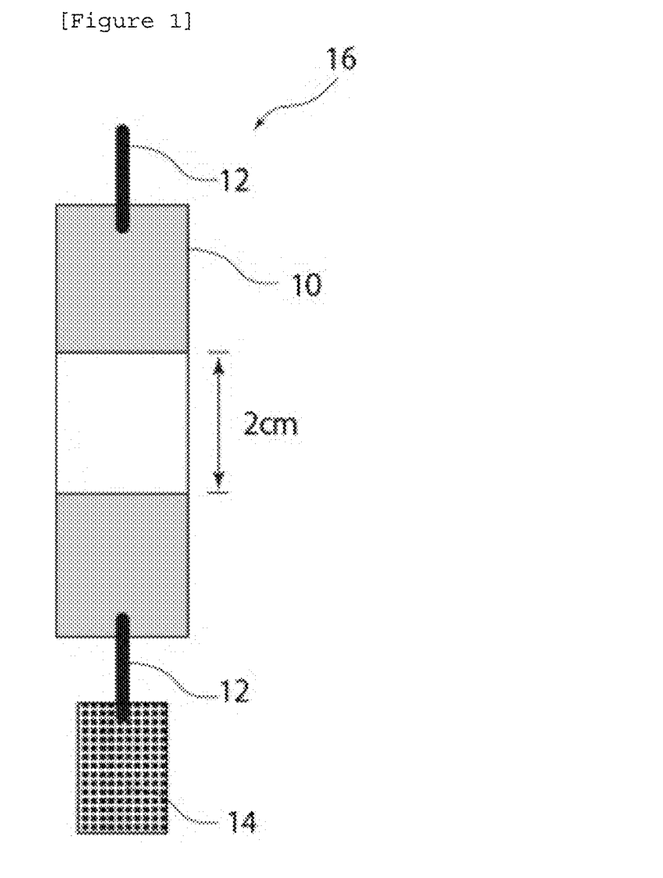
FIG. 1 is a schematic diagram showing a shape of samples used for an evaluation in Examples.

The prepared film was cut into a width of 15 mm and a length of 60 mm to make a specimen. As shown in FIG. 1, a clip 12 was attached to the top and the bottom of the film 10, and the clips 12 were fixed with cellophane adhesive tapes. A sample 16 was prepared by attaching a weight 14 to one of the clips 12 such that a load of 450 g/cm² was applied to the specimen when the sample 16 was hung. Note that the central portion (2 cm) of the film 10 was not covered with the cellophane adhesive tapes.

Figure 2:
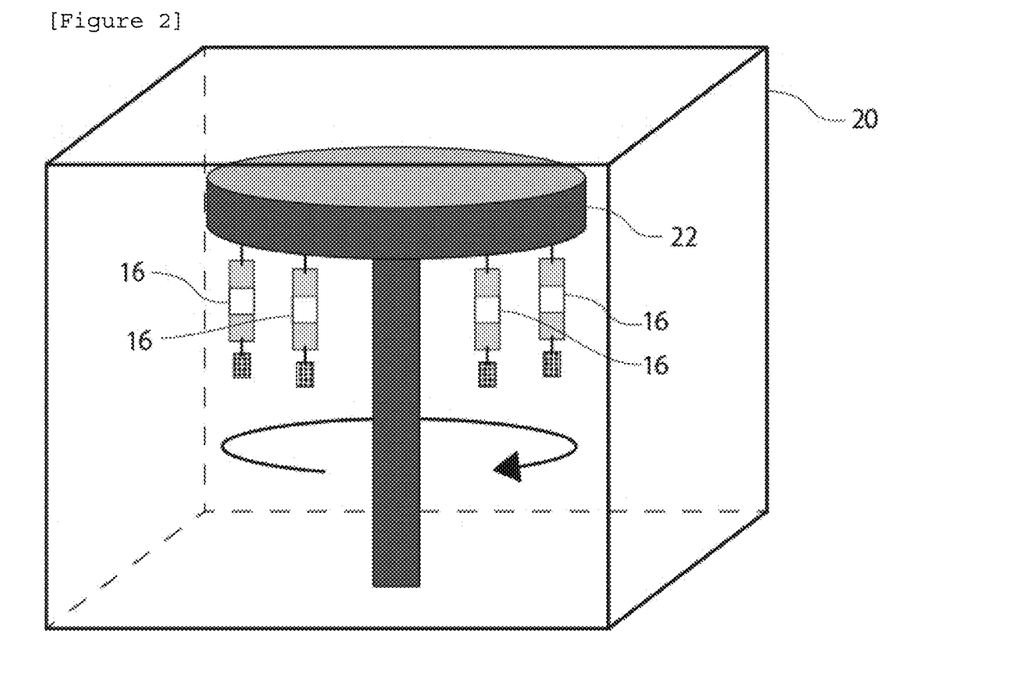
FIG. 2 is a schematic diagram showing the shape of a Geer oven used for an evaluation in Examples.

Subsequently, as shown in FIG. 2, the clip 12 to which the weight 14 for the sample 16 was not attached was attached to the rotary table 22 of the Geer oven 20. Thereafter, the temperature in the Geer oven 20 was increased at a rate of 3° C./min from room temperature while the rotary table 22 was rotated at 5 rpm. The temperature (softening point (° C.)) at the time when the film 10 was broken or the film 10 was elongated twice was measured to evaluate the heat resistance according to the evaluation criteria described below. The results are shown in Tables 2-1 and 2-2.

- 1 (Excellent): 220° C. or higher
- 2 (Good): 200° C. or higher and lower than 220° C.
- 3 (Normal): 180° C. or higher and lower than 200° C.
- 4 (Allowable): 160° C. or higher and lower than 180° C.
- 5 (Not Allowable): lower than 160° C.

(Adhesion Force)

A urethane resin (trade name "Leathermin NE-8875-30M," manufactured by Dainichiseika Color & Chemicals Mfg. Co., Ltd.) for synthetic leather was applied on release paper and dried at 120° C. to form a skin layer having a thickness of 50 m. The adhesive was applied on the formed skin layer and then dried at 70° C. for 3 minutes and 100° C. for 1 minute to form an adhesion layer having a thickness of 100 m. Base cloth of a polyester mesh material was bonded to the surface of the formed adhesion layer. The release paper was released after aging at 50° C. for 24 hours to obtain synthetic leather for testing. The obtained synthetic leather was cut out into a width of 2 cm to make a specimen. The skin layer/base cloth were subjected to the T-peel test using a tensile tester (trade name "Autograph AGS-500NS," manufactured by SHIMADZU CORPORATION) under conditions of 25° C. and a tensile speed of 200 mm/min to evaluate the adhesion force according to the evaluation criteria described below. The results are shown in Tables 2-1 and 2-2.

- 1 (Excellent): 1.0 kgf/cm or more, or the material is broken
- 2 (Good): 0.7 kgf/cm or more and less than 1.0 kgf/cm
- 3 (Normal): 0.5 kgf/cm or more and less than 0.7 kgf/cm
- 4 (Allowable): 0.2 kgf/cm or more and less than 0.5 kgf/cm
- 5 (Not Allowable): less than 0.2 kgf/cm <Production of Paint and Preparation of Test Sheet>

To 20 parts of the aqueous polyurethane dispersion, 1.8 parts of a matting agent (trade name "ACEMATT TS-100," manufactured by Evonik Industries AG, volume average particle size 9.5 m) and ion-exchanged water were added to obtain an aqueous surface treatment agent (solid content 20%). To 100 parts of the obtained surface treatment agent, 2.0 parts (in other words, 33.3 parts based on 100 parts of the polyurethane resin (solid content)) of an isocyanate-based curing agent (trade name "DURANATE WT30-100," manufactured by Asahi Kasei Corporation) was added to prepare a paint. The prepared paint was applied on a PVC sheet using a bar coater. The applied paint was dried at 120° C. for 1 minute using a drier to obtain a test sheet including a film having a thickness of 10 μm formed thereon.

<Evaluations of Paint>

(Abrasion Resistance)

A specimen having a width of 70 mm and a length of 300 mm was cutout from the test sheet. The specimen was placed on a cushion material put on a plane abrasion table of a JASO M403/88/plane abrasion tester (B method, manufactured by DAIEI KAGAKU SEIKI MFG. CO., LTD.) for seat skin fabric material and was fixed with a clamp so as not to wrinkle. A friction block to which No. 6 cotton canvas specified by JIS L 3102 (Cotton Canvas) was set was brought into contact with the surface of the specimen. The pressure load including the abrasion block was set to 9.81 N (1 kgf) to conduct an abrasion test in which the abrasion block was moved back and forth 10,000 times under conditions of a stroke of 140 mm and a rate of 60±10 reciprocating motions/min. The abrasion resistance was evaluated according to the evaluation criteria described below. The results are shown in Tables 2-1 and 2-2.

1 (Excellent): There is no change in appearance
2 (Good): There is no scratch, and there is a slight change in appearance
3 (Normal): There is no scratch, but there is clearly a change in appearance
4 (Allowable): One or more and less than five scratches can be recognized
5 (Not Allowable): Five or more scratches can be recognized (Dispersibility)

The appearance of the test sheet was visually observed and the tactile impression of the surface was checked to evaluate the dispersibility according to the evaluation criteria described below. The results are shown in Tables 2-1 and 2-2.

1 (Excellent): A white point due to the aggregation of the matting agent cannot be seen from the appearance, and coarse particles are not felt by tactile impression.
2 (Good): One to five white points can be seen in a range of 5 cm×5 cm. Coarse particles are not felt by tactile impression.
3 (Normal): One to five white points can be seen in a range of 5 cm×5 cm. Coarse particles are slightly felt by tactile impression.
4 (Allowable): Five to ten white points can be seen in a range of 5 cm×5 cm. Coarse particles are clearly felt by tactile impression.
5 (Not Allowable): The coating film is white and not transparent.

(Cold-Resistant Bendability)

A specimen having a width of 50 mm and a length of 150 mm was cut out from the test sheet. A bendability test was conducted using a De Mattia tester under conditions of a bending stroke of 100 mm and −10° C. to evaluate the cold-resistant bendability according to the evaluation criteria described below. The results are shown in Tables 2-1 and 2-2.

1 (Excellent): Whitening and breakage do not occur in 30,000 cycles of bending
2 (Good): Whitening or breakage occurs in 20,000 or more and less than 30,000 cycles of bending
3 (Normal): Whitening or breakage occurs in 10,000 or more and less than 20,000 cycles of bending
4 (Allowable): Whitening or breakage occurs in 5,000 or more and less than 10,000 cycles of bending
5 (Not Allowable): Whitening or breakage occurs in less than 5,000 cycles of bending

TABLE 2-1

| | | Examples | | | Reference Example | Examples | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Storage stability of aqueous polyurethane dispersion | | 3 | 3 | 3 | 3 | 3 | 2 | 4 | 3 | 3 | 1 | 4 | 4 |
| NCO group/OH group (molar ratio) | | 6.44 | 6.44 | 6.44 | 6.44 | 32.90 | 3.64 | 19.38 | 2.04 | 1.51 | 6.54 | 6.34 | 6.28 |
| Evaluations of adhesive | Rate A of change in physical property | 2 | 3 | 2 | 1 | 3 | 3 | 3 | 3 | 4 | 3 | 2 | 1 |
| | Rate B of change in physical property | 3 | 3 | 2 | 1 | 3 | 3 | 3 | 3 | 4 | 3 | 2 | 2 |
| | Solvent resistance | 3 | 2 | 3 | 4 | 4 | 1 | 4 | 3 | 4 | 4 | 3 | 2 |
| | Long-term heat resistance | 3 | 2 | 3 | 4 | 3 | 3 | 3 | 3 | 3 | 3 | 3 | 3 |
| | Heat resistance | 3 | 3 | 3 | 3 | 4 | 1 | 4 | 3 | 3 | 4 | 2 | 2 |
| | Adhesion force | 2 | 2 | 2 | 2 | 3 | 3 | 3 | 3 | 4 | 3 | 2 | 2 |
| Evaluations of paint | Abrasion resistance | 1 | 1 | 2 | 4 | 2 | 3 | 2 | 2 | 4 | 1 | 1 | 1 |
| | Dispersibility | 2 | 2 | 2 | 1 | 3 | 1 | 4 | 2 | 2 | 2 | 2 | 2 |
| | Cold-resistant bendability | 2 | 2 | 1 | 1 | 3 | 3 | 3 | 3 | 4 | 2 | 2 | 2 |

TABLE 2-2

| | | Examples | | | | | | Comparative Examples | | | | | | |
|---|---|---|---|---|---|---|---|---|---|---|---|---|---|---|
| | | 13 | 14 | 15 | 16 | 17 | 18 | 1 | 2 | 3 | 4 | 5 | 6 | 7 |
| Storage stability of aqueous polyurethane dispersion | | 1 | 4 | 4 | 3 | 4 | 2 | 1 | 3 | 5 | 5 | 1 | 5 | 1 |
| NCO group/OH group (molar ratio) | | 6.53 | 12.94 | 7.99 | 7.50 | 8.07 | 4.08 | 9.05 | 6.44 | — | 8.25 | 1.69 | 6.24 | 6.58 |
| Evaluations of adhesive | Rate A of change in physical property | 2 | 3 | 2 | 1 | 1 | 4 | 5 | 5 | 3 | 1 | 5 | 1 | 5 |
| | Rate B of change in physical property | 3 | 3 | 2 | 2 | 1 | 4 | 5 | 5 | 3 | 2 | 5 | 1 | 5 |
| | Solvent resistance | 3 | 3 | 3 | 4 | 4 | 2 | 4 | 1 | 5 | 4 | 3 | 1 | 3 |
| | Long-term heat resistance | 3 | 3 | 3 | 4 | 4 | 2 | 5 | 1 | 3 | 3 | 3 | 3 | 3 |
| | Heat resistance | 3 | 1 | 4 | 3 | 4 | 2 | 5 | 3 | 5 | 4 | 3 | 1 | 5 |
| | Adhesion force | 3 | 3 | 3 | 3 | 4 | 4 | 3 | 2 | 3 | 2 | 4 | 1 | 3 |
| Evaluations of paint | Abrasion resistance | 2 | 2 | 3 | 2 | 4 | 1 | 5 | 1 | 4 | 1 | 2 | 4 | 2 |
| | Dispersibility | 2 | 2 | 4 | 3 | 4 | 1 | 1 | 3 | 5 | 3 | 2 | 2 | 2 |
| | Cold-resistant bendability | 2 | 3 | 3 | 1 | 1 | 4 | 1 | 5 | 3 | 5 | 5 | 1 | 4 |

INDUSTRIAL APPLICABILITY

The aqueous polyurethane dispersion of the present invention is useful as, for example, not only a material for forming adhesive layers for various products of synthetic leather and the like but also a coating agent, a paint, and the like that are capable of forming cured films having excellent abrasion resistance and cold-resistant bendability.

REFERENCE SIGNS LIST

10 Film
12 Clip
14 Weight
16 Sample
20 Geer oven
22 Rotary table

The invention claimed is:

1. An aqueous polyurethane dispersion comprising:
resin particles formed with a polyurethane having a hydroxy group at a terminal thereof; and
water as a dispersion medium,
wherein the polyurethane has a structure derived from a urethane prepolymer,
the urethane prepolymer comprises:
a constituent unit derived from a polyol, the polyol comprising:
a polyether polyol,
a polycarbonate polyol, and
an acidic group-containing polyol; and
a constituent unit derived from a polyisocyanate comprising an aliphatic polyisocyanate and an alicyclic polyisocyanate,
the polyurethane has an acid value of 30 mgKOH/g or lower,
the polyurethane has a hydroxyl value in a range from 0.5 mg/KOH/g to 35.9 mgKOH/g, and
the mass ratio of the polyether polyol (C) to the polycarbonate polyol (D), (C): (D), is in a range from 20:80 to 95:5.

2. The aqueous polyurethane dispersion according to claim 1, wherein
the urethane prepolymer is a reaction product having an isocyanate group at a terminal thereof, the reaction product obtained by reacting the polyisocyanate and the polyol in a ratio of an isocyanate group (NCO group) in the polyisocyanate to a hydroxy group (OH group) in the polyol, [NCO group/OH group (molar ratio)], of larger than 1, and
the polyurethane is a reaction product obtained by reacting the urethane prepolymer and an alkanolamine.

3. The aqueous polyurethane dispersion according to claim 2, wherein the polyurethane is a reaction product obtained by reacting 10 mol % or more of the alkanolamine based on the amount of isocyanate group in the urethane prepolymer.

4. The aqueous polyurethane dispersion according to claim 2, wherein the alkanolamine is an alkanolmonoamine.

5. The aqueous polyurethane dispersion according to claim 2, wherein the urethane prepolymer is a reaction product obtained by reacting the polyisocyanate and the polyol in a ratio of the isocyanate group (NCO group) in the polyisocyanate to the hydroxy group (OH group) in the polyol, [NCO group/OH group (molar ratio)], of larger than 1 but not exceeding 1.7.

6. The aqueous polyurethane dispersion according to claim 1, wherein the molar ratio of the aliphatic polyisocyanate (A) to the alicyclic polyisocyanate (B), (A): (B), is in a range from 10:90 to 90:10.

7. The aqueous polyurethane dispersion according to claim 1, wherein the mass ratio of the polyether polyol (C) to the polycarbonate polyol (D), (C): (D), is in a range from 25:75 to 90:10.

8. The aqueous polyurethane dispersion according to claim 1, wherein the resin particles have a cumulative 50% particle size ($D_{50}$) in a range from 5 to 500 nm in the particle size distribution on a volume basis.

9. An adhesive comprising:
the aqueous polyurethane dispersion according to claim 1; and
an isocyanate-based curing agent.

10. Synthetic leather comprising an adhesion layer formed with the adhesive according to claim 9.

11. A paint comprising the aqueous polyurethane dispersion according to claim 1.

* * * * *